United States Patent
Park et al.

(10) Patent No.: US 11,640,507 B2
(45) Date of Patent: May 2, 2023

(54) VEHICLE TERMINAL, SYSTEM, AND METHOD FOR PROCESSING MESSAGE

(71) Applicants: HYUNDAI MOTOR COMPANY, Seoul (KR); KIA MOTORS CORPORATION, Seoul (KR)

(72) Inventors: Sung Soo Park, Incheon (KR); Soon Kwon Paik, Yongin-si (KR); Seung Shin Lee, Seoul (KR); Chang Woo Chun, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 266 days.

(21) Appl. No.: 16/805,068

(22) Filed: Feb. 28, 2020

(65) Prior Publication Data

US 2021/0150141 A1    May 20, 2021

(30) Foreign Application Priority Data

Nov. 19, 2019  (KR) ........................ 10-2019-0148357

(51) Int. Cl.
| | |
|---|---|
| *G06F 40/279* | (2020.01) |
| *G06F 40/268* | (2020.01) |
| *G06F 40/263* | (2020.01) |
| *H04W 4/80* | (2018.01) |
| *B60W 40/08* | (2012.01) |
| *H04W 4/14* | (2009.01) |
| *G06F 40/10* | (2020.01) |
| *G06V 20/59* | (2022.01) |

(52) U.S. Cl.
CPC ........... *G06F 40/268* (2020.01); *B60W 40/08* (2013.01); *G06F 40/10* (2020.01); *G06F 40/263* (2020.01); *G06F 40/279* (2020.01); *G06V 20/597* (2022.01); *H04W 4/14* (2013.01); *H04W 4/80* (2018.02)

(58) Field of Classification Search
CPC ...... G06F 40/268; G06F 40/279; G06F 40/10; G06F 40/263; H04W 4/80; H04W 4/14; B60W 40/08; G06K 9/00845
See application file for complete search history.

(56) References Cited

U.S. PATENT DOCUMENTS

| | | | | |
|---|---|---|---|---|
| 8,816,837 | B2 * | 8/2014 | Braden | G08G 1/096775 |
| | | | | 340/936 |
| 9,699,301 | B1 * | 7/2017 | Siritzky | H04M 1/72436 |
| 9,965,953 | B1 * | 5/2018 | Gordon | G08G 1/096741 |
| 9,979,826 | B1 * | 5/2018 | Hajdu | H04M 3/38 |
| 10,270,718 | B2 * | 4/2019 | Schubert | H04L 51/224 |
| 10,636,230 | B1 * | 4/2020 | Laranang | G07C 9/28 |
| 10,685,521 | B1 * | 6/2020 | Laranang | G06Q 10/083 |
| 10,841,248 | B1 * | 11/2020 | Hajdu | H04W 4/80 |

(Continued)

*Primary Examiner* — Vijay B Chawan
(74) *Attorney, Agent, or Firm* — Lempia Summerfield Katz LLC

(57) ABSTRACT

A vehicle terminal system for processing a message includes: a portable device for receiving the message; and a vehicle terminal for analyzing a text of the message received from the portable device to yield an analysis result, and for determining a recommended operation corresponding to the analysis result. Thus, the vehicle terminal does not output pop-up images for all messages received from the portable device and recommends a message suitable for the user.

17 Claims, 7 Drawing Sheets

(56) References Cited

U.S. PATENT DOCUMENTS

| | | | |
|---|---|---|---|
| 2004/0193399 A1* | 9/2004 | Potter | G06F 40/232 704/4 |
| 2010/0216509 A1* | 8/2010 | Riemer | H04M 1/72463 455/557 |
| 2010/0305807 A1* | 12/2010 | Basir | B60R 16/0373 704/235 |
| 2011/0275358 A1* | 11/2011 | Faenger | H04W 8/24 455/420 |
| 2013/0157629 A1* | 6/2013 | Lee | H04M 3/42059 455/414.1 |
| 2014/0081519 A1* | 3/2014 | Prakah-Asante | G01C 21/3697 701/36 |
| 2015/0039108 A1* | 2/2015 | Paik | G06F 3/167 700/94 |
| 2015/0133098 A1* | 5/2015 | Warr | H04W 4/16 455/418 |
| 2015/0310020 A1* | 10/2015 | Brav | G06F 40/30 707/730 |
| 2016/0246378 A1* | 8/2016 | Sampanes | G06F 3/0482 |
| 2016/0253318 A1* | 9/2016 | Lee | G06F 40/40 704/4 |
| 2017/0187654 A1* | 6/2017 | Lee | H04L 51/02 |
| 2017/0249934 A1* | 8/2017 | Kang | G06F 40/279 |
| 2019/0052747 A1* | 2/2019 | Breaux | G06K 9/0053 |
| 2019/0132436 A1* | 5/2019 | Jang | H04W 4/12 |
| 2020/0074491 A1* | 3/2020 | Scholl | G06F 11/3055 |
| 2020/0107292 A1* | 4/2020 | Shin | H04W 4/14 |
| 2020/0228646 A1* | 7/2020 | Hotes | H04M 1/72454 |
| 2020/0259948 A1* | 8/2020 | Keohane | H04L 67/52 |
| 2020/0346663 A1* | 11/2020 | Park | G08G 1/096741 |
| 2021/0004437 A1* | 1/2021 | Zhang | G06F 40/205 |
| 2021/0362733 A1* | 11/2021 | Yoon | B60W 50/0205 |
| 2022/0261552 A1* | 8/2022 | Tanaka | G06F 40/51 |

\* cited by examiner

VEHICLE TERMINAL, SYSTEM, AND METHOD FOR PROCESSING MESSAGE

CROSS-REFERENCE TO RELATED APPLICATION

This application claims the benefit of priority to Korean Patent Application No. 10-2019-0148357, filed in the Korean Intellectual Property Office on Nov. 19, 2019, the entire contents of which are incorporated herein by reference.

TECHNICAL FIELD

The present disclosure relates to a vehicle terminal, a system, and a method for processing a message.

BACKGROUND

Technology for allowing information of a portable device to be utilized in a vehicle by being linked with (in Bluetooth connection with) the portable device when a user boards the vehicle has been developed. For example, when a message is received by the portable device, the vehicle may receive message information from the portable device and output a pop-up image from which the user may select a scheme, i.e., a plan for outputting the message through a display in the vehicle. However, since the vehicle outputs the pop-up images for all messages received by the portable device, there is inconvenience for the user since a scheme needs to be selected for outputting the message each time the message is received.

SUMMARY

The present disclosure has been made to solve the above-mentioned problems occurring in the prior art while advantages achieved by the prior art are maintained intact.

An aspect of the present disclosure provides a system and a method for processing a message in which a vehicle analyzes a message received from a portable device and recommends only a message suitable for a user when the vehicle is linked or connected with the portable device.

The technical problems to be solved by the present inventive concept are not limited to the aforementioned problems. Any other technical problems not mentioned herein should be clearly understood from the following description by those of ordinary skill in the art to which the present disclosure pertains.

According to an aspect of the present disclosure, a vehicle terminal for processing a message includes: a communicator for receiving the message from a portable device; and a controller that analyzes a text of the message received from the portable device to yield an analysis result and that determines a recommended operation corresponding to the analysis result.

In one embodiment, the controller may: determine whether there is a previously stored text pattern in the received message to yield a determination result; classify a category of the message based on the determination result; and determine an operation based on the classified category as the recommended operation corresponding to the analysis result.

In one embodiment, the controller may determine the category of the message as a spam message when there is a text pattern stored to block a message included in the received message.

In one embodiment, the controller may determine blocking an output of the message as the recommended operation corresponding to the analysis result when the category of the message is determined as the spam message.

In one embodiment, the controller may determine the category of the message as a general message when the text pattern is absent in the received message.

In one embodiment, the controller may determine whether there is a previously stored execution history of an operation for the general message when determining that the category of the message is the general message. The controller may determine an operation based on the execution history as the recommended operation when there is the execution history.

In one embodiment, the controller may classify a driver's state based on traveling information of the vehicle when the execution history is absent. The controller may determine an operation based on the driver's state as the recommended operation.

In one embodiment, the controller may summarize the message based on the determined recommended operation when the recommended operation is determined based on the driver's state.

In one embodiment, the controller may determine a message summarization scheme corresponding to the driver's state.

In one embodiment, the controller may extract morphemes from the message and determine an intention of a message sender when the message summarization scheme is determined.

According to an aspect of the present disclosure, a system for processing a message includes: a portable device for receiving the message; and a vehicle terminal for analyzing a text of the message received from the portable device to yield an analysis result, and for determining a recommended operation corresponding to the analysis result.

According to an aspect of the present disclosure, a method for processing a message includes receiving the message from a portable device, analyzing a text of the message received from the portable device to yield an analysis result, and determining a recommended operation corresponding to the analysis result.

In one embodiment, the analyzing of the text may include determining whether there is a previously stored text pattern in the received message to yield a determination result and classifying a category of the message based on the determination result.

In one embodiment, the method may further include determining the category of the message as a spam message when there is a text pattern stored to block a sender included in the received message.

In one embodiment, the method may further include determining blocking an output of the message as the recommended operation corresponding to the analysis result when the category of the message is determined as the spam message.

In one embodiment, the method may further include determining the category of the message as a general message when the previously stored text pattern is absent in the received message.

In one embodiment, the method may further include determining whether there is a previously stored execution history of an operation for the general message when it is determined that the category of the message is the general message. The method may further include determining an operation based on the execution history as the recommended operation when there is the execution history.

In one embodiment, the method may further include classifying a driver's state based on traveling information of a vehicle when the execution history is absent and determining an operation corresponding to the driver's state as the recommended operation.

In one embodiment, the method may further include summarizing the message based on the determined recommended operation when the recommended operation is determined corresponding to the driver's state.

In one embodiment, the method may further include determining a message summarization scheme corresponding to the driver's state.

In one embodiment, the method may further include extracting morphemes from the message and determining an intention of a message sender when the message summarization scheme is determined.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
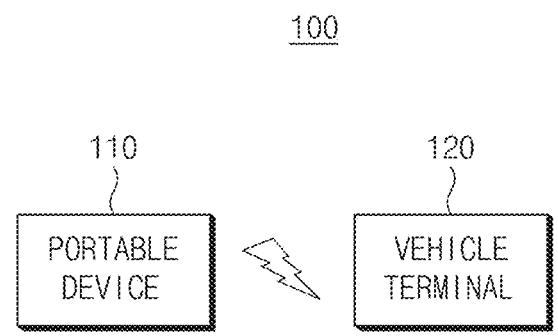
FIG. 1 is a diagram illustrating a configuration of a system for processing a message according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function is omitted when it is determined that it interferes with the understanding of the embodiment of the present disclosure. Further, when an element in the written description and claims is described as being "for" performing or carry out a stated function, step, set of instructions, or the like, the element may also be considered as being "configured to" do so.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art and should not be interpreted in an idealized or overly formal sense unless expressly so defined herein.

FIG. 1 is a diagram illustrating a configuration of a system for processing a message according to an embodiment of the present disclosure.

As shown in FIG. 1, a message processing system 100 according to an embodiment of the present disclosure may include a portable device 110 and a vehicle terminal 120.

The portable device 110 may include a smart phone that may receive a message. The portable device 110 may be linked or connected with a vehicle by performing wireless communication or wired communication with the vehicle. In addition, the portable device 110 may transmit the message to the vehicle when being linked with the vehicle. A more specific operation is described below with reference to FIG. 2.

The vehicle terminal 120 may be disposed in the vehicle and may receive the message from the portable device 110 when being linked with the portable device 110. In addition, the vehicle terminal 120 may analyze the received message to yield an analysis result and determine a recommended operation corresponding to the analysis result. In this example, the recommended operation may mean a recommended operation about a scheme or plan for outputting the message. In this example, the recommended operation may include a video output, an audio output, and the like. A more specific operation is described below with reference to FIG. 3.

Figure 2:
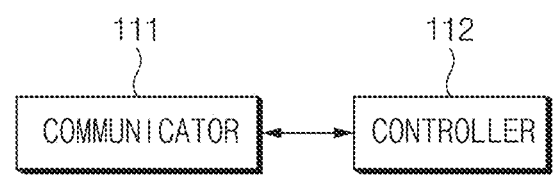
FIG. 2 is a diagram illustrating a configuration of a portable device according to an embodiment of the present disclosure.

FIG. 2 is a diagram illustrating a configuration of a portable device according to an embodiment of the present disclosure.

As shown in FIG. 2, the portable device 110 may include a communicator 111 and a controller 112.

The communicator 111 may be connected to the vehicle terminal 120 in a wired or wireless manner. The communicator 111 may be connected to the vehicle terminal 120 by a USB cable when using a wired connection, and wirelessly by a Wi-Fi direct communication. According to an embodiment, the communicator 111 may be connected to the vehicle terminal 120 through short-range wireless communication such as a Wireless broadband, a World Interoperability for Microwave Access (Wimax), a Bluetooth, a Radio Frequency Identification (RFID), an infrared Data Association (IrDA), a Ultra Wideband (UWB), a ZigBee, and the like. In addition, the communicator 111 may receive a message sent from a sender.

When the communicator 111 is connected to the vehicle terminal 120 in the wired or wireless manner, the controller 112 may control to transmit the message received from the sender to the vehicle terminal 120.

Figure 3:
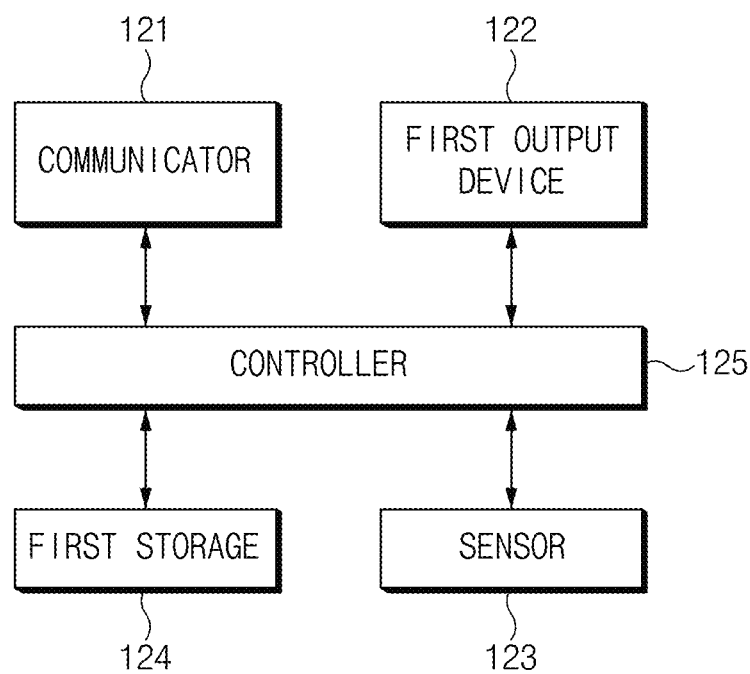
FIG. 3 is a diagram illustrating a configuration of a vehicle terminal according to an embodiment of the present disclosure.

FIG. 3 is a diagram illustrating a configuration of a vehicle terminal according to an embodiment of the present disclosure.

As shown in FIG. 3, the vehicle terminal 120 may include a communicator 121, a first output device 122, a sensor 123, a first storage 124, and a controller 125.

The communicator 121 may be in communication with the portable device 110 in a wired or wireless manner. The communicator 121 may be in communication with a server (not shown) in a wireless manner. The communicator 121 may be connected to the portable device 110 by a USB cable when using a wired connection, and wirelessly by Wi-Fi direct communication. According to an embodiment, the communicator 121 may be connected to the portable device 110 through short-range wireless communication such as a Wireless broadband, a World Interoperability for Microwave Access (Wimax), a Bluetooth, a Radio Frequency Identification (RFID), an infrared Data Association (IrDA), a Ultra Wideband (UWB), a ZigBee, and the like. In addition, the communicator 121 may receive a message from the portable device 110.

The first output device 122 may output the recommended operation determined from the controller 125. The first output device 122 may include a display device and a sound output device. The display device may visually output the recommended operation. Further, the sound output device may audibly output the recommended operation. According to an embodiment, the display device may be implemented as a touch screen panel, and the sound output device may be implemented as a speaker.

The sensor 123 may obtain traveling information of the vehicle. In this example, the traveling information may include information about a traveling speed of the vehicle, a gearshift state, and a road. To this end, the sensor 123 may be implemented as a speed sensor, a gearshift sensor, or an image sensor.

The first storage 124 may store at least one algorithm for performing calculation or execution of various computer-executable instructions for an operation of the vehicle terminal according to an embodiment of the present disclosure. The first storage 124 may include at least a memory or computer-readable medium, one storage medium of a flash memory, a hard disk, a memory card, a read-only memory (ROM), a random access memory (RAM), or an electrically erasable programmable read-only memory (EEPROM, a programmable read-only memory (PROM), a magnetic memory, a magnetic disk, and/or an optical disk.

The controller 125 may be implemented by various processing devices, such as a microprocessor. The microprocessor may execute the algorithm or program containing the computer-executable instructions stored in the computer-readable medium or storage 124. The microprocessor may have a semiconductor chip and the like capable of performing the calculation or the execution of the various instructions embedded therein. The microprocessor may control overall operations of the vehicle terminal according to an embodiment of the present disclosure. Specifically, the controller 125 may analyze the text of the message received from the portable device 110 and determine the recommended operation corresponding to the analysis result.

More specifically, the controller 125 may determine whether there is a text pattern in the message received from the portable device 110. The controller 125 may receive the text pattern from the server (not shown) and continuously update the text pattern and store the received text pattern in the storage 124. In this example, the controller 125 may determine whether the text pattern is included in the message received from the portable device 110 regardless of an order. In this example, the text pattern may include a text pattern stored to block a message. For example, the controller 125 may determine whether one or more words: 'advertisement', 'free blocking' and 'sender blocking' are included in the message received from the portable device 110 regardless of the order. In another example, the controller 125 may determine whether one or more words: 'card', 'lump sum payment', 'payment', 'sent from WEB', and 'card company name' are included in the message received from the portable device 110 regardless of the order. In addition, the controller 125 may determine whether a specific phrase preset by the user or whether a blocked telephone number is included in the message received from the portable device 110.

When determining that the text pattern set by the user to block the message is included in the message received from the portable device 110 as described above, the controller 125 may classify a category of the message as a spam message based on the text pattern. For example, the controller 125 may determine the category of the message as an advertisement-related spam message when the message received from the portable device 110 includes the one or more words: 'advertisement', 'free blocking', and 'sender blocking' regardless of the order. In another example, the controller 125 may determine the category of the message as a finance-related spam message when the message received from the portable device 110 includes the one or more words: 'card', 'lump sum payment', 'payment', 'sent from WEB', and 'card company name' regardless of the order. In addition, the controller 125 may determine the category of the message as a user-related spam message when the specific phrase preset by the user or the blocked telephone number is included in the message received from the portable device 110. In addition, when determining that a text pattern set to allow the message is included in the message received from the portable device 110, the controller 125 may classify the category of the message based on the corresponding text pattern.

The controller 125 may perform a learning operation to classify the category for the received message in a faster and more convenient manner. According to an embodiment, the controller 125 may input the text pattern of the received message, learn the input text pattern using a recurrent neural network (RNN) model, and classify the category of the message. In addition, when determining that the classified category is a finance-related message, the controller 125 may control to block the voice output for the finance-related message. In this example, the text pattern may include 'advertisement', 'announcement', 'verification number', 'customer', 'URL/HMLT link', and 'special character'.

On the other hand, when determining that the text pattern is not included in the message received from the portable device 110, the controller 125 may determine the category of the message as a general message.

When the category classification of the message received from the portable device 110 is completed, the controller 125 may control the recommended operation corresponding to the classification result to be executed. In this example, the recommended operation corresponding to the classification result may be set by the user and stored in the first storage 124. For example, an operation for the advertisement-related spam message, the finance-related spam message, and the user-related spam message may be set as a blocking message output as the recommended operation.

Therefore, when the message received from the portable device 110 is determined to be an advertisement-related spam message, a finance-related spam message, or a user-related spam message, the controller 125 may control to block the message output. In addition, when it is determined that the message received from the portable device 110 is a general message, the controller 125 may determine whether there is an execution history of a recommended operation for each sender to yield a determination result. In this example, the controller 125 may control the recommended operation to be executed based on the determination result.

When it is determined that there is an execution history of the recommended operation for each sender, the controller 125 may control the recommended operation to be executed based on the execution history. In this example, the recommended operation may be one of the video output, the audio output, and closing. The execution may mean selection of one of the recommended operations. The controller 125 may store the selected operation among the recommended operations in the first storage 124 as the execution history. According to an embodiment, the controller 125 may control to store a received telephone number, a sender who sent the received message, a recommended operation selected for the received message, and a reception time in the first storage 124 when storing the execution history of the recommended operation.

The controller 125 may extract a selection frequency of the recommended operation based on the execution history of the recommended operation stored in the first storage 124. The controller 125 may control the recommended operation selected at the highest frequency to be executed based on a reliability thereof. For example, when the sender is the wife of the user, and when it is determined that the frequency of selecting the voice output as the recommended operation for the message received from the wife is the highest based on the execution history, the controller 125 may calculate a reliability of the recommended operation having the highest frequency. The controller 125 may control to execute the recommended operation when the reliability exceeds a reference value.

However, the present disclosure is not limited thereto. The controller 125 may control to output an interactive pop-up message when the recommended operations selected for the received message are concentrated to one recommended operation based on the execution history for a predetermined period in the past based on a current time point. According to an embodiment, when the recommended operations were selected five times or more for the message received from the wife based on the execution history for three months based on the current time point, and when voice output is the selected recommended operation 99% or more of the time, the controller 125 may output the message: 'A text message arrived from your wife. I will read the text message.' together with an icon for selecting whether to execute the recommended operation in a pop-up form. When there is no input from the driver, the controller 125 controls to operate the recommended operation automatically. In one example, when there is an input from the driver, in which the driver does not want the execute the recommended operation, the controller 125 may control not to execute the recommended operation.

On the other hand, when determining that there is no execution history of the recommended operation for each sender, the controller 125 may classify a driver's state based on the traveling information of the vehicle obtained from the sensor 123. The controller 125 may determine the recommended operation based on the driver's state. In this example, the traveling information may include the information about the traveling speed of the vehicle, the gearshift state, and the road.

According to an embodiment, when determining that the gearshift state is parking, the controller 125 may determine the driver's state as a 'level 1'. In this example, the 'level 1' may be determined to be a state in which the driver is relaxed. Thus, it may be determined that the output of the received message does not significantly affect the driving of the driver. Further, when determining that the gearshift state is a reverse state, i.e., in reverse, the controller 125 may determine the driver's state as a 'level 4'. In this example, the 'level 4' may be determined to be a state in which an element hindering the driving of the driver should be prohibited. Thus, it may be determined that the output of the received message may have a significant effect on the driving of the driver. In addition, when determining that the traveling speed of the vehicle is less than a first speed (e.g., 60 km/h (37.28 mph)), the controller 125 may determine the driver's state as the 'level 1'. In addition, when the traveling speed of the vehicle exceeds a second speed (e.g., 100 km/h (62.13 mph)), or when a road being traveled is an expressway, the controller 125 may determine the driver's state as the 'level 3'. In this example, the 'level 3' may be determined to be a state in which the driver concentrates on driving while traveling on the road. Thus, it may be determined that the output of the received message may affect the driving of the driver. In addition, when it is determined that the traveling speed of the vehicle is equal to or higher than the first speed and equal to or lower than the second speed, and the road being traveled is not the expressway, the controller 125 may determine the driver's state as a 'level 2'. In this example, the 'level 2' may be determined to be a state in which the driver concentrates on driving while traveling on the road. Thus, it may be determined that the output of the received message may affect the road driving less than when the state is the 'level 3'.

When the driver's state is determined based on the traveling information, the controller 125 may determine an operation based on the driver's state as the recommended operation. In addition, the controller 125 may summarize the message based on the determined recommended operation and may determine a message summarization scheme based on the driver's state. According to an embodiment, the controller 125 may determine a message summarization step based on the driver's state and summarize the message.

TABLE 1

| Driver's state | Recommended operation |
|---|---|
| Level 1 (relaxed) | Voice-outputting received message |
| Level 2 (normal) | First step-summarizing received message and then voice-outputting first step-summarized message |
| Level 3 (concentrated) | Second step-summarizing received message and then voice-outputting second step-summarized message |
| Level 4 (prohibiting hindering) | Waiting for output message until driver's state is changed to another state |

According to an embodiment, as shown in Table 1, when determining that the driver's state is the 'level 1', the controller 125 may determine the recommended operation as voice-outputting the received message. Also, when determining that the driver's state is the 'level 2', the controller 125 may determine the recommended operation as first step-summarizing the received message and then voice-outputting the first step-summarized message. Further, when determining that the driver's state is the 'level 3', the controller 125 may determine the recommended operation as second step-summarizing the received message and then voice-outputting the second step-summarized message. In addition, when determining that the driver's state is the 'level 4', the controller 125 may determine the recommended operation as waiting for the voice-output of the message until the driver's state is changed to another state.

As described above, the controller 125 may determine the received message summarization scheme corresponding to the driver's state. The controller 125 may extract morphemes from the received message for the summarization of the received message and determine an intention of the sender. Specifically, when the recommended operation determined based on the driver's state is the first step-summarizing of the received message and then the voice-outputting of the first step-summarized message, the controller 125 may generate the first step-summarized message by combining the extracted morphemes with the intention of the sender. In this example, the controller 125 may control to voice-output the first step-summarized message. In addition, when the recommended operation determined based on the driver's state is the second step-summarizing of the received message and then the voice-outputting of the second step-summarized message, the controller 125 may generate the second step-summarized message by summarizing the message such that only the intention of the sender is included. In this example, the controller 125 may control to voice-output the second step-summarized message.

In an example, when the received message is 'Hi, manager. How are you?', the controller 125 may extract 'Hi', 'How', 'Are' and 'You' as the morphemes. In addition, the controller 125 may determine that the intention of the sender is 'regards' for the received message. When the recommended operation is the first step-summarizing of the received message and then the voice-outputting of the first step-summarized message, the controller 125 may combine the extracted morphemes with the intention of the sender to generate 'Hi, How are you? The regards message has arrived.' as the first step-summarized message, and control to voice-output the first step-summarized message. In addition, when the recommended operation is the second step-summarizing of the received message and then the voice-outputting of the second step-summarized message, the controller 125 may generate: 'The regards message has arrived.' as the second step-summarized message. In this example, the controller 125 may control to voice-output the second step-summarized message.

In another example, when the received message is 'The meeting place seems too far, let's change the meeting place to Gangnam station.', the controller 125 may extract 'Gangnam station', 'meeting place', and 'change' as the morphemes. In addition, the controller 125 may determine that the intention of the sender is 'transferring information' for the received message. When the recommended operation is the first step-summarizing of the received message and then the voice-outputting of the first step-summarized message, the controller 125 may generate 'The meeting place is changed to Gangnam station. Information transferring message has arrived.' as the first step-summarized message by combining the extracted morphemes with the intention of the sender. In this example, the controller 125 may control to voice-output the first step-summarized message. In addition, when the recommended operation determined based on the driver's state is the second step-summarizing of the message and then the voice-outputting of the second step-summarized message, the controller 125 may generate: 'The information transferring message has arrived.' as the second step-summarized message. In this example, the controller 125 may control to voice-output the second step-summarized message.

In another example, when the received message is 'Please transfer this to Hong Gil-dong working at Company A.', the controller 125 may extract: 'Company A', 'Working', 'Hong Gil-dong', and 'transfer' as the morphemes. In addition, the controller 125 may determine that the intention of the sender is 'request' for the received message. When the recommended operation determined based on the driver's state is the first step-summarizing of the received message and then voice-outputting of the first step-summarized message, the controller 125 may generate 'Company A, Hong Gil-dong, Working, Transfer, A request message has arrived.' as the first step-summarized message. In this example, the controller 125 may control to voice-output the first step-summarized message. In addition, when the recommended operation determined based on the driver's state is the second step-summarizing of the received message and then the voice-outputting of the second step-summarized message, the controller 125 may generate 'The request message has arrived.' as the second step-summarized message. In this example, the controller 125 may control to voice-output the second step-summarized message.

According to an embodiment of the present disclosure, the controller 125 may extract the morphemes from the received message and determine the intention of the sender through machine learning about the extracted morphemes. A more detailed description thereof is provided below with reference to FIG. 4.

Figure 4:
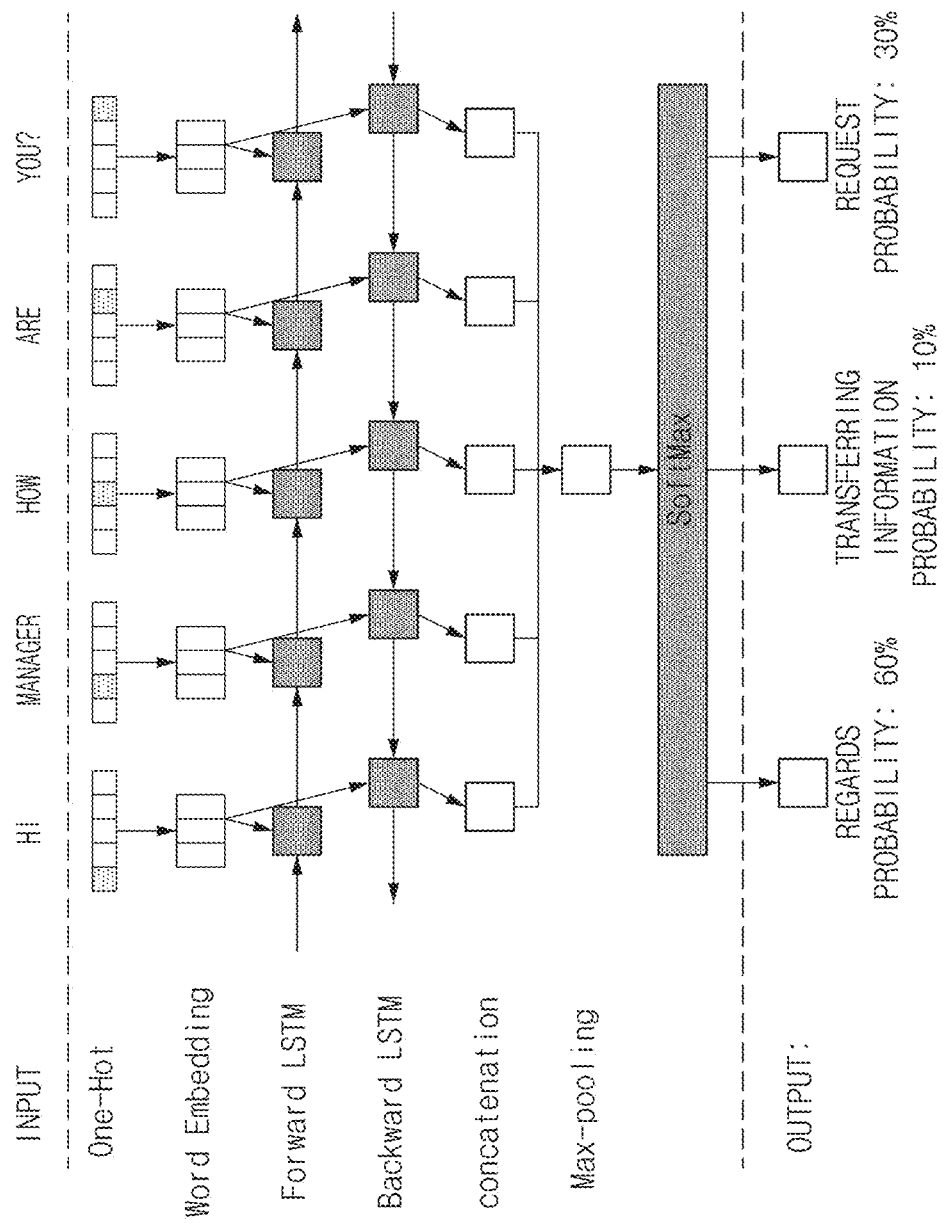
FIG. 4 is a diagram schematically illustrating a learning operation for determining an intention of a sender according to an embodiment of the present disclosure.

FIG. 4 is a diagram schematically illustrating a learning operation for determining an intention of a sender according to an embodiment of the present disclosure.

As shown in FIG. 4, the controller 125 may perform a ONE-HOT encoding for the received message: 'Hi, manager. How are you?'. The controller may perform the ONE-HOT encoding to represent words as vectors; learn words having similar meanings through word embedding; learn the words through a learning model including a forward long short term memory (LSTM) and a backward long short term memory (LSTM); concatenate messages with respect to the learning result with each other; perform max-pooling to calculate intentions of the sender in a probability; and output an intention of the sender with the highest probability.

Figure 5:
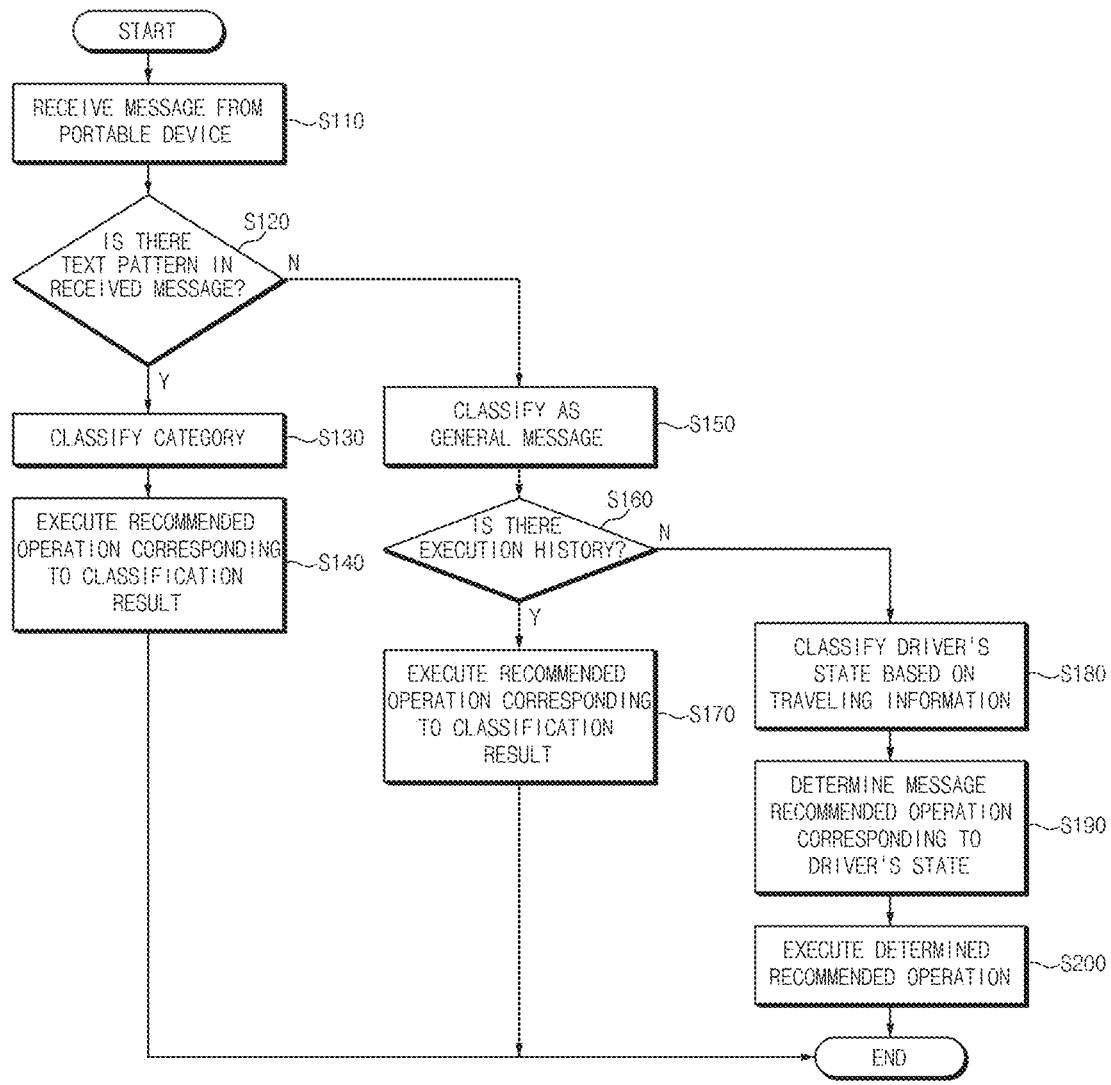
FIG. 5 is a flowchart illustrating a method for processing a message according to an embodiment of the present disclosure.

FIG. 5 is a flowchart illustrating a method for processing a message according to an embodiment of the present disclosure.

As shown in FIG. 5, the controller 125 may receive the message from the portable device (S110). Further, the controller 125 may determine whether there is the text pattern in the received message (S120). In S120, the controller 125 may receive the text pattern from the server (not shown) and continuously update the text pattern. The controller 125 may determine whether the text pattern is included in the message received from the portable device 110 regardless of the order.

In an example, in S120, the controller 125 may determine whether one or more words: 'advertisement', 'free blocking' and 'sender blocking', are included in the message received from the portable device 110 regardless of the order. In another example, the controller 125 may determine whether one or more words: 'card', 'lump sum payment', 'payment', 'sent from WEB', and 'card company name' are included in the message received from the portable device 110 regardless of the order. The present disclosure is not limited thereto. In S120, the controller 125 may determine whether the specific phrase preset by the user, the blocked telephone number, or the like are included in the message received from the portable device 110.

When determining in S120 that the text pattern set stored to block the message is included in the message received from the portable device 110 (Y), the controller 125 may classify the category of the message as a spam message based on the text pattern (S130). In S130, the controller 125 may determine the category of the message as the advertisement-related spam message when the message received from the portable device 110 includes the one or more words: 'advertisement', 'free blocking', and 'sender blocking' regardless of the order. In another example, the controller 125 may determine the category of the message as the finance-related spam message when the message received from the portable device 110 includes the one or more words: 'card', 'lump sum payment', 'payment', 'sent from WEB', and 'card company name' regardless of the order. In addition, the controller 125 may determine the category of the message as the user-related spam message when the specific phrase preset by the user or the blocked telephone number is included in the message received from the portable device 110.

When the category classification of the message received from the portable device 110 is completed in S130, the controller 125 may control an operation based on the classification result to be executed (S140) as the recommended operation. In this example, the recommended operation corresponding to the classification result may be set by the user and stored in the first storage 124. For example, the recommended operation for the advertisement-related spam message, the finance-related spam message, and the user-related spam message may be set as the blocking message output. Therefore, when the message received from the portable device 110 is determined to be the advertisement-related spam message, the finance-related spam message, or the user-related spam message in S140, the controller 125 may control to block the message output.

When it is determined in S150 that the message received from the portable device 110 in S120 is the general message, the controller 125 may determine whether there is an execution history of the recommended operation for each sender (S160).

When it is determined in S160 that there is an execution history of the recommended operation for each sender (Y), the controller 125 may control the recommended operation to be executed based on the execution history (S170). In this example, the recommended operation may be one of the video output, the audio output, and the closing. The execution may mean the selection of one of the recommended operations. In S170, the controller 125 may store the selected operation among the recommended operations in the first storage 124 as the execution history. According to an embodiment, the controller 125 may control to store the received telephone number, the sender who sent the received message, the recommended operation selected for the received message, and the reception time in the first storage 124 when storing the execution history of the recommended operation.

In S170, the controller 125 may extract the selection frequency of the recommended operation based on the execution history of the recommended operation stored in the first storage 124. The controller 125 may control the recommended operation selected at the highest frequency to be executed based on a reliability thereof. For example, when the sender is the wife, and when it is determined that the frequency of selecting the voice output as the recommended operation for the message received from the wife is the highest based on the execution history, the controller 125 may calculate the reliability of the recommended operation having the highest frequency. The controller 125 may control to execute the recommended operation when the reliability exceeds the reference value.

On the other hand, when determining in S160 that there is no execution history of the recommended operation for each sender, the controller 125 may classify the driver's state based on the traveling information of the vehicle obtained from the sensor 123 (S180). In this example, the traveling information may include the information about the traveling speed of the vehicle, the gearshift state, and the road. A more detailed description of S180 is provided below with reference to FIG. 6.

When the driver's state is determined based on the traveling information, the controller 125 may determine the recommended operation corresponding to the driver's state (S190). According to an embodiment, when determining that the driver's state is the 'level 1' in S190, the controller 125 may determine the recommended operation as the voice-outputting of the received message. Also, when determining that the driver's state is the 'level 2', the controller 125 may determine the recommended operation as the first step-summarizing of the received message and then the voice-outputting of the first step-summarized message. Further, when determining that the driver's state is the 'level 3', the controller 125 may determine the recommended operation as the second step-summarizing of the received message and then the voice-outputting of the second step-summarized message. In addition, when determining that the driver's state is the 'level 4', the controller 125 may determine the recommended operation as the waiting for the voice-output of the message until the driver's state is changed to another state. In addition, the controller 125 may control to execute the determined recommended operation (S200).

In S190, the controller 125 may first extract the morphemes from the received message to summarize the message and determine the intention of the sender. In one example, when the received message is 'Hi, manager. How are you?', the controller 125 may extract: 'Hi', 'How', 'Are' and 'You' as the morphemes. In addition, the controller 125 may determine that the intention of the sender is 'regards' for the received message.

When it is determined in S190 that the recommended operation is the first step-summarizing of the message based on the driver's state, the controller 125 may summarize the message by combining the extracted morphemes with the intention of the sender. The controller 125 may control to voice-output the summarized message in S200. For example, in S200, the controller 125 may generate the message: 'Hi! How are you? The regards message has arrived.' as the first step-summarized message, and control to voice-output the first step-summarized message. In addition, when it is determined that the recommended operation is the second step-summarizing of the message based on the driver's state, the controller 125 may summarize the message such that only the intention of the sender is included. In this example, the controller 125 may control to voice-output the second step-summarized message. For example, the controller 125 may generate the message: 'The regards message has arrived.' as the second step-summarized message, and control to voice-output the second step-summarized message.

In another example, when the received message is 'The meeting place seems too far, let's change the meeting place to Gangnam station.' in S190, the controller 125 may extract 'Gangnam station', 'meeting place', and 'change' as the morphemes. In addition, the controller 125 may determine that the intention of the sender is 'transferring information' for the received message. When it is determined in S190 that the recommended operation is the first step-summarizing of the message based on the driver's state, the controller 125 may generate the message: 'The meeting place is changed to Gangnam station. Information transferring message has arrived.' as the first step-summarized message. In this example, the controller 125 may control to voice-output the first step-summarized message in S200. In addition, when it is determined in S190 that the recommended operation is the second step-summarizing of the message based on the driver's state, the controller 125 may generate the 'The information transferring message has arrived.' as the second step-summarized message. In this example, the controller 125 may control to voice-output the second step-summarized message in S200.

In another example, when the received message is 'Please transfer this to Hong Gil-dong working at Company A.' in S190, the controller 125 may extract: 'Company A', 'Working', 'Hong Gil-dong', and 'transfer' as the morphemes. In addition, the controller 125 may determine that the intention of the sender is 'request' for the received message. When it is determined in S190 that the recommended operation is the first step-summarizing of the received message based on the driver's state, the controller 125 may generate the message: 'Company A, Hong Gil-dong, Working, Transfer, A request message has arrived.' as the first step-summarized message. In this example, the controller 125 may control to voice-output the first step-summarized message. In addition, when it is determined in S190 that the recommended operation is the second step-summarizing of the received message based on the driver's state, the controller 125 may generate the 'The request message has arrived.' as the second step-summarized message. In this example, the controller 125 may control to voice-output the second step-summarized message.

Figure 6:
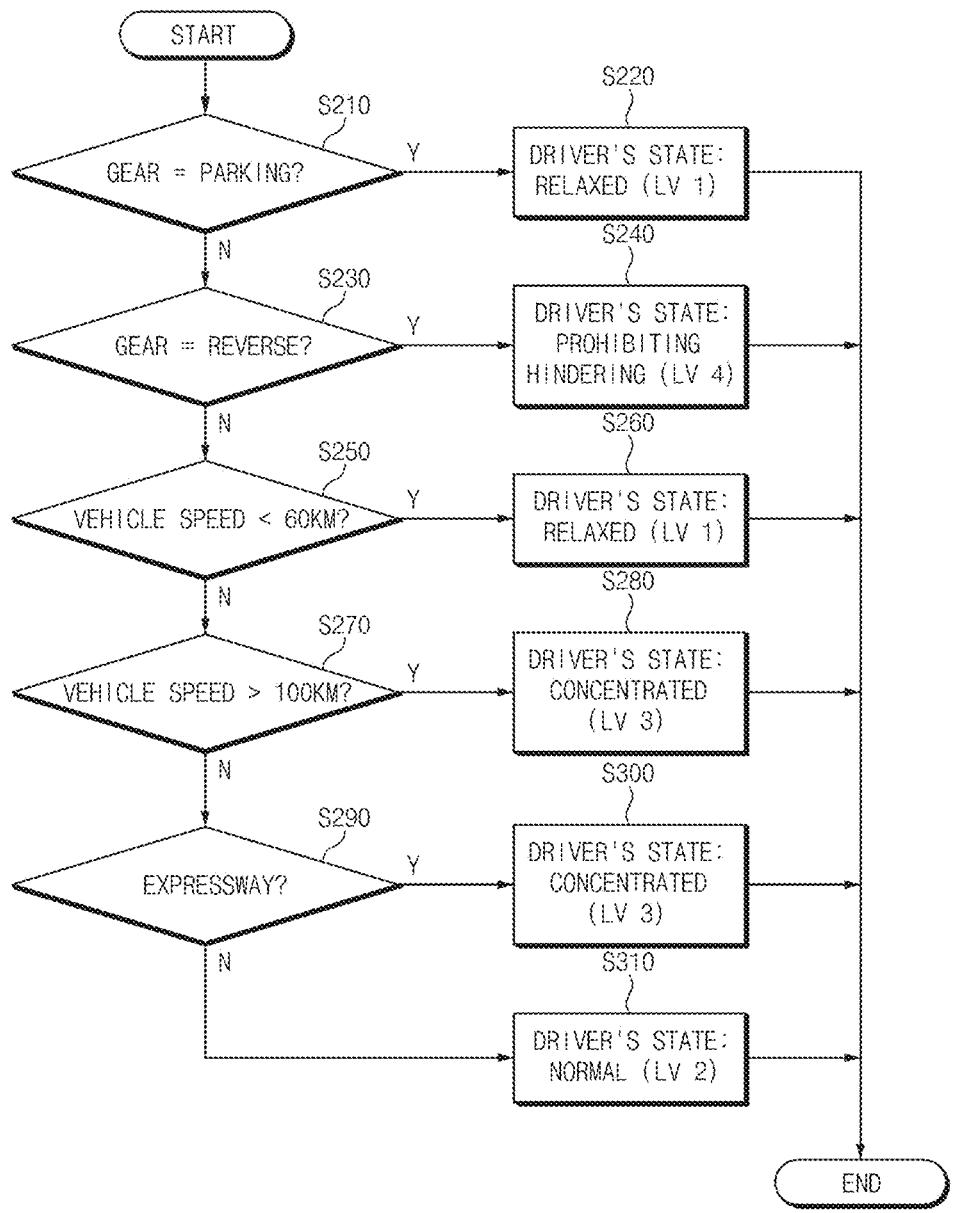
FIG. 6 is a flowchart illustrating a method for classifying driver's states based on traveling information according to an embodiment of the present disclosure.

FIG. 6 is a flowchart illustrating a method for classifying driver's states based on traveling information according to an embodiment of the present disclosure.

As shown in FIG. 6, the controller 125 may determine whether the gearshift state is parking (S210). When determining in S210 that the gearshift state is parking (Y), the controller 125 may determine the driver's state as the 'level 1' (S220). In S220, the 'level 1' may be determined to be the state in which the driver is relaxed. Thus, it may be determined that the output of the received message does not significantly affect traveling of the driver.

On the other hand, when determining in S210 that the gearshift state is not parking (N), the controller 125 may determine whether the gearshift state is reverse (S230). When determining in S230 that the gearshift state is reverse, the controller 125 may determine the driver's state as the 'level 4' (S240). In S240, the 'level 4' may be determined to be the state in which the element hindering the driving of the driver should be prohibited. Thus, it may be determined that the output of the received message may have a significant effect on the driving of the driver.

On the other hand, when determining in S230 that the gearshift state is not reverse (N), the controller 125 may determine that the gearshift state is traveling. The controller 125 may determine whether the traveling speed of the vehicle is less than the first speed (e.g., 60 km/h (37.28 mph)) (S250). In addition, when determining in S250 that the traveling speed of the vehicle is less than the first speed (Y), the controller 125 may determine the driver's state as the 'level 1' (S260).

On the other hand, when determining in S250 that the traveling speed of the vehicle is not less than the first speed (N), the controller 125 may determine whether the traveling speed of the vehicle exceeds the second speed (e.g., 100 km/h (62.14 mph)) (S270). When determining in S270 that the traveling speed of the vehicle exceeds the second speed (Y), the controller 125 may determine the driver's state as the 'level 3' (S280). In this example, the 'level 3' may be determined to be the state in which the driver concentrates on driving while traveling on the road, and thus, it may be determined that the output of the received message may affect the driving of the driver.

In addition, when determining in S270 that the traveling speed of the vehicle does not exceed the second speed (N), the controller 125 may determine whether the road being traveled is the expressway (S290). When determining in S290 that the road being traveled is the expressway (Y), the controller 125 may determine the driver's state as the 'level 3' (S300).

On the other hand, when determining in S290 that the road being traveled is not the expressway (N), the controller 125 may determine that the traveling speed of the vehicle is equal to or higher than the first speed, and equal to or lower than the second speed, and the road being traveled is not the expressway. In this example, the controller 125 may determine the driver's state as the 'level 2' (S310). In this example, the 'level 2' may be determined to be the state in which the driver concentrates on driving while traveling on the road. Thus, it may be determined that the output of the received message may affect driving less than the state of the 'level 3'.

Figure 7:
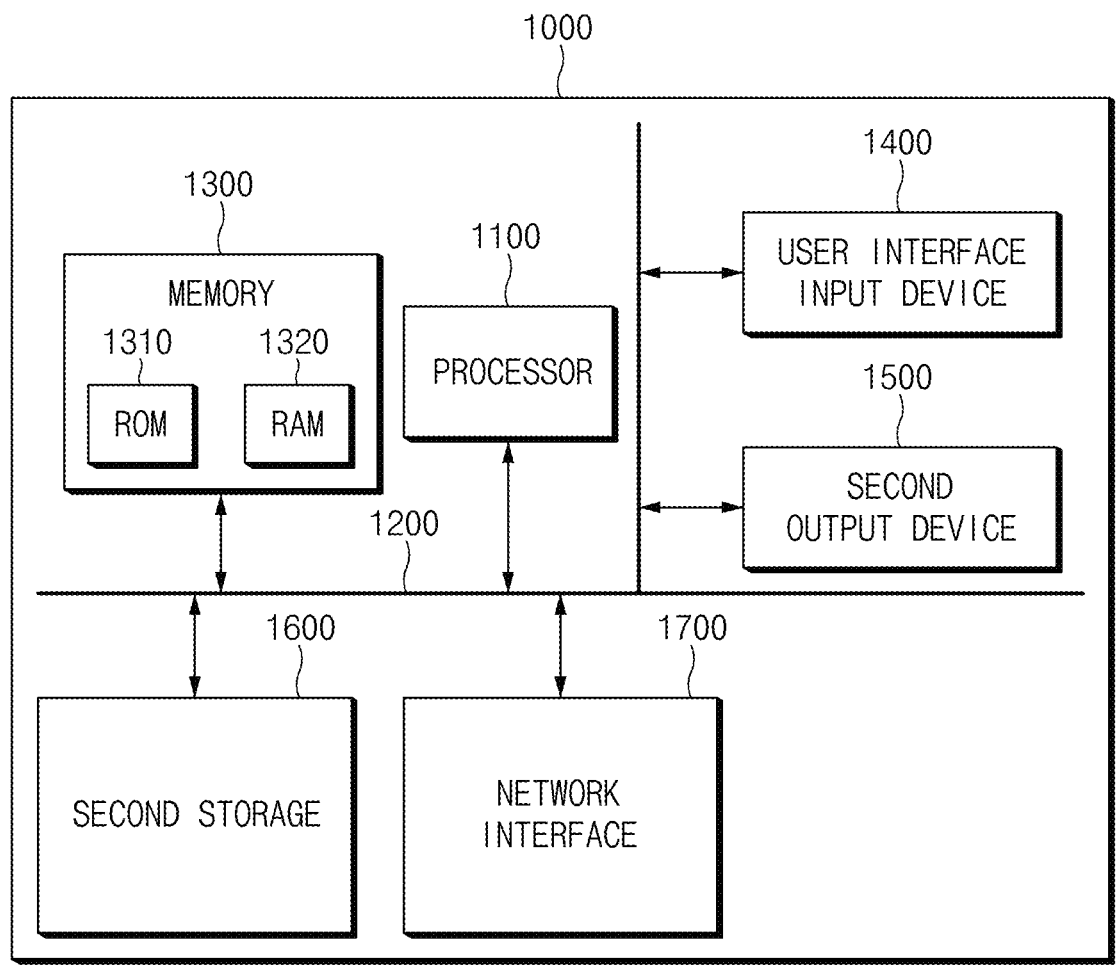
FIG. 7 illustrates a computing system in which a method according to an embodiment of the present disclosure is implemented.

FIG. 7 illustrates a computing system in which a method according to an embodiment of the present disclosure is implemented.

Referring to FIG. 7, a computing system 1000 may include at least one processor 1100, a memory 1300, a user interface input device 1400, a second user interface output device 1500, a second storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the methods or the algorithms described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The storage medium may be coupled to the processor 1100. The processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The description above is merely illustrative of the technical idea of the present disclosure. Various modifications and changes may be made by those of ordinary skill in the art without departing from the essential characteristics of the present disclosure.

Therefore, the embodiments disclosed in the present disclosure are provided to explain the spirit and scope of the present disclosure, but not to limit them, so that the spirit and scope of the present disclosure is not limited by the embodiments. The scope of the present disclosure should be construed on the basis of the accompanying claims. All the technical ideas within the scope equivalent to the claims should be included in the scope of the present disclosure.

The vehicle terminal, the system, and the method for processing a message according to an embodiment of the present disclosure do not output pop-up images for all messages received from the portable device and recommend a message suitable for the user. Thereby, the convenience of the user is improved.

Hereinabove, although the present disclosure has been described with reference to various embodiments and the accompanying drawings, the present disclosure is not limited thereto, but may be variously modified and altered by those of ordinary skill in the art to which the present disclosure pertains without departing from the spirit and scope of the present disclosure claimed in the following claims.

What is claimed is:

1. A vehicle terminal for processing a message, the vehicle terminal comprising:
   a communicator for receiving the message from a portable device, wherein the communicator is connected to the vehicle terminal in a wired or wireless manner; and
   a controller configured to:
      analyze a text of the message received from the portable device to yield an analysis result; and
      determine a recommended operation corresponding to the analysis result,
   wherein the controller learns a text pattern of the message in the received message to yield a learning result and classifies a category of the message based on the learning result, and
   wherein the controller further
      determines whether there is a previously stored execution history of an operation for a general message when determining that the category of the message is the general message,
      extracts a selection frequency of the recommended operation based on the execution history,
      calculates a reliability of a recommended operation having a highest frequency, and
      controls to execute the recommended operation when the reliability exceeds a reference value.

2. The vehicle terminal of claim 1, wherein the controller is configured to:
   determine an operation based on the classified category as the recommended operation corresponding to the analysis result.

3. The vehicle terminal of claim 2, wherein the controller is configured to determine the category of the message as a spam message when there is a text pattern stored to block a message included in the received message.

4. The vehicle terminal of claim 3, wherein the controller is configured to determine blocking an output of the message as the recommended operation corresponding to the analysis result when the category of the message is determined as the spam message.

5. The vehicle terminal of claim 2, wherein the controller is configured to determine the category of the message as the general message when the text pattern is absent in the received message.

6. The vehicle terminal of claim 1, wherein the controller is configured to:
   classify a driver's state based on traveling information of the vehicle when the execution history is absent; and
   determine an operation based on the driver's state as the recommended operation.

7. The vehicle terminal of claim 6, wherein the controller is configured to summarize the message based on the determined recommended operation when the recommended operation is determined corresponding to the driver's state.

8. The vehicle terminal of claim 7, wherein the controller is configured to determine a message summarization scheme corresponding to the driver's state.

9. The vehicle terminal of claim 8, wherein the controller is configured to extract morphemes from the message and determine an intention of a message sender when the message summarization scheme is determined.

10. A system for processing a message, the system comprising:
    a portable device for receiving the message; and
    a vehicle terminal for analyzing a text of the message received from the portable device to yield an analysis result and determining a recommended operation corresponding to the analysis result,
    wherein the vehicle terminal learns a text pattern of the message in the received message to yield a learning result and classifies a category of the message based on the learning result and
    wherein the vehicle terminal further
       determines whether there is a previously stored execution history of an operation for a general message when determining that the category of the message is the general message,
       extracts a selection frequency of the recommended operation based on the execution history,
       calculates a reliability of a recommended operation having a highest frequency, and
       controls to execute the recommended operation when the reliability exceeds a reference value.

11. A method for processing a message, the method comprising:
    receiving, by a controller, the message from a portable device;
    analyzing, by the controller, a text of the message received from the portable device to yield an analysis result; and
    determining, by a controller, a recommended operation corresponding to the analysis result,
    wherein the controller learns a text pattern of the message in the received message to yield a learning result and classifies a category of the message based on the learning result, and
    wherein the controller further
       determines whether there is a previously stored execution history of an operation for a general message when determining that the category of the message is the general message,
       extracts a selection frequency of the recommended operation based on the execution history,
       calculates a reliability of a recommended operation having a highest frequency, and
       controls to execute the recommended operation when the reliability exceeds a reference value.

12. The method of claim 11, further comprising:
    determining the category of the message as a spam message when there is a text pattern stored to block a sender included in the received message.

13. The method of claim 12, further comprising:
determining blocking an output of the message as the recommended operation corresponding to the analysis result when the category of the message is determined as the spam message.

14. The method of claim 11, further comprising:
determining the category of the message as the general message when the text pattern is absent in the received message.

15. The method of claim 11, further comprising:
classifying a driver's state based on traveling information of a vehicle when the execution history is absent; and
determining an operation based on the driver's state as the recommended operation.

16. The method of claim 15, further comprising:
summarizing the message based on the determined recommended operation when the recommended operation is determined corresponding to the driver's state.

17. The method of claim 16, further comprising:
determining a message summarization scheme corresponding to the driver's state,
extracting morphemes from the message and determining an intention of a message sender when the message summarization scheme is determined.

* * * * *